(No Model.)
E. J. KRIEG.
LIFE PRESERVER.
No. 476,277. Patented June 7, 1892.
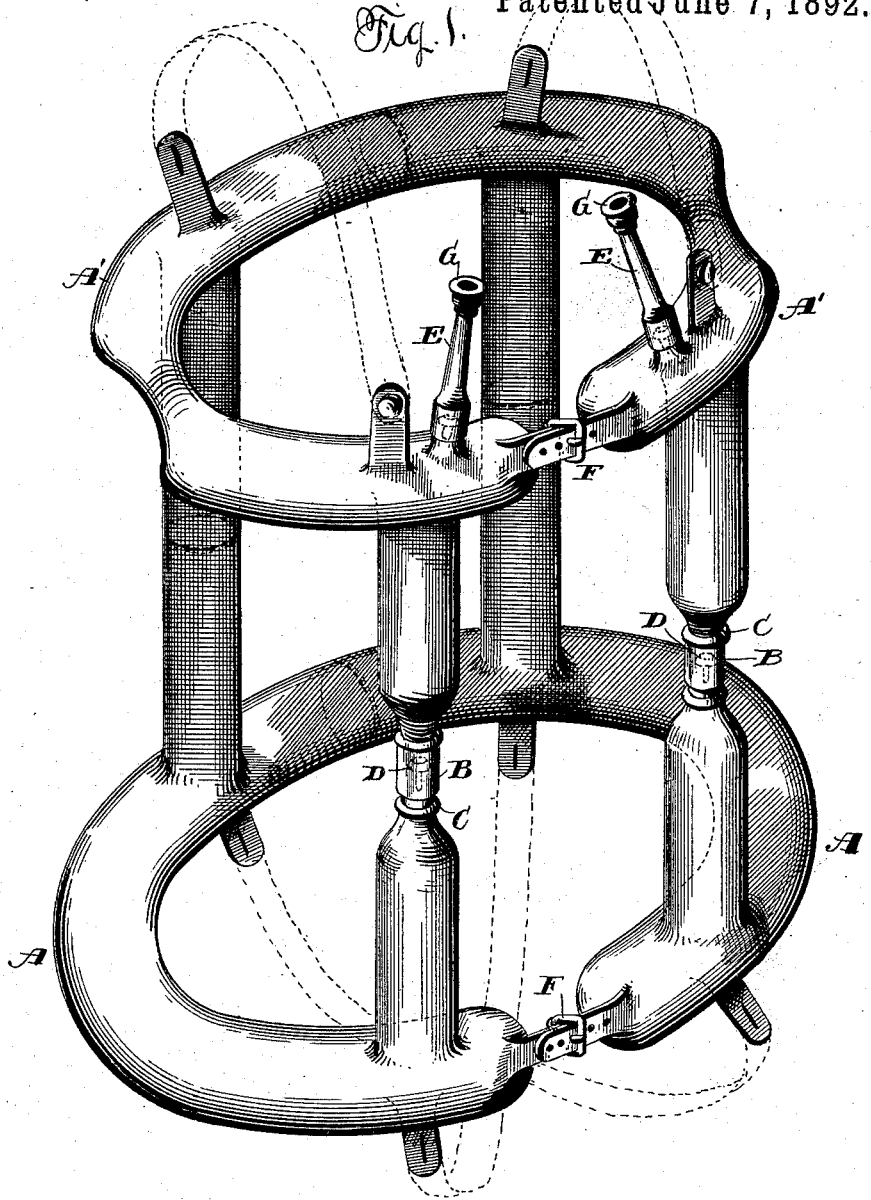
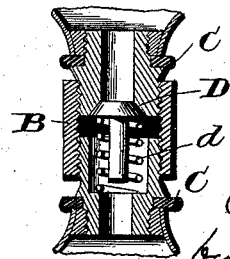
Witnesses
C. J. Williamson
A. L. Hough
Inventor
Eugene J. Krieg
by Franklin H. Hough
his atty.

UNITED STATES PATENT OFFICE.

EUGENE J. KRIEG, OF MARQUETTE, MICHIGAN.

LIFE-PRESERVER.

SPECIFICATION forming part of Letters Patent No. 476,277, dated June 7, 1892.

Application filed March 16, 1892. Serial No. 425,129. (No model.)

*To all whom it may concern:*

Be it known that I, EUGENE J. KRIEG, a citizen of the United States, residing at Marquette, in the county of Marquette and State of Michigan, have invented certain new and useful Improvements in Life-Preservers; and I declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in life-preservers; and it has for its object to provide a preserver of the character hereinafter described, which shall be simple in construction and one which can be quickly and easily adjusted to the body of a person for use in an emergency, and so constructed as to have separate compartments connected together by couplings having suitable valves, so that in case of an accident to any portion of the life-preserver, whereby a tear made in the silk rubber, of which material the preserver is made, would let in water, the said valves would prevent the water from passing into the various compartments.

To these ends and to such others as the invention may pertain the same consists in the novel construction, combination, and adaptation of the various parts hereinafter fully described, and then specifically defined in the appended claims.

The invention is clearly illustrated in the accompanying drawings, in which—

Figure 1 is a perspective of a life-preserver embodying my invention. Fig. 2 are detail views of the couplings and valves connected therewith.

Reference now being had to the drawings by letter, similar letters of reference indicate like parts throughout, in which—

A represents a rubber tubing, preferably constructed of silk rubber, so as to make the same as tough and durable as possible, which I propose to make from three to four inches in diameter when inflated with air.

A' is a tubing similar to A, and the two are connected together by upright tubes of a somewhat smaller diameter.

In the construction of my preserver I prefer to use four upright or vertical connecting-tubes, although I do not confine my invention to the use of any definite number.

In the vertical or upright chambers are interposed couplings B.

C are rubber gaskets.

Within the vertical air-chambers, where the two tubes are connected, are the valves D, which valves being of a conical shape and acted upon by the springs $d\,d$ tend to prevent the passage of any water from the lower compartments to the upper ones in case of a leakage in the lower air-chambers. I use but two valves in the vertical chambers, although I do not confine myself to any particular number, as the number may vary. In the rear air-chambers, where valves are not employed, I place partitions which are air-tight and situated about in the middle of the upright chambers.

E E are mouthpieces used to inflate my preserver and are provided with valves of the same construction as those heretofore described in connection with the upright air-chambers. On the upper surface of the upper and lower air-chambers are straps provided with loops or buttons for attachment to straps which pass over the shoulders on the upper chamber and on the lower chamber under the body between the limbs of the individual.

F F are buckles to adjust the preserver to the body of the wearer.

G G are mouthpieces attached to the inflating-tubes.

The construction, adaptation, and operation of my life-preserver will be readily understood. The jacket, collapsed, is fitted to the body and securely buckled, the upper air-chamber being narrowed so as to make a comfortable fit under the armpits, and when properly adjusted can be inflated in a short time.

It will be observed that my preserver, as shown, has four compartments, the upper chambers being divided by partitions as well as the lower ones.

Having thus fully described my invention, what I claim as new, and desire to secure by Letters Patent, is—

1. A life-preserver consisting of tubing connected by vertical tubes, inflating-valves in said vertical tubes, and mouthpieces to the tubing, provided with similar valves, substantially as described.

2. The combination, with the upper and lower tubing A and A', provided with straps and connecting devices, of the vertical tubes connecting said tubing, inflating-valves in said tubes, and mouthpieces on the upper tubing, provided with valves, substantially as described.

In testimony whereof I affix my signature in presence of witnesses.

EUGENE J. KRIEG.

Witnesses:
 HENRY W. ZERBEL,
 ROBERT R. TODD,
 N. A. METZ.